Nov. 30, 1954  M. LANGLEY ET AL  2,695,461
CROP DRYING MACHINE
Filed March 5, 1951  6 Sheets-Sheet 5
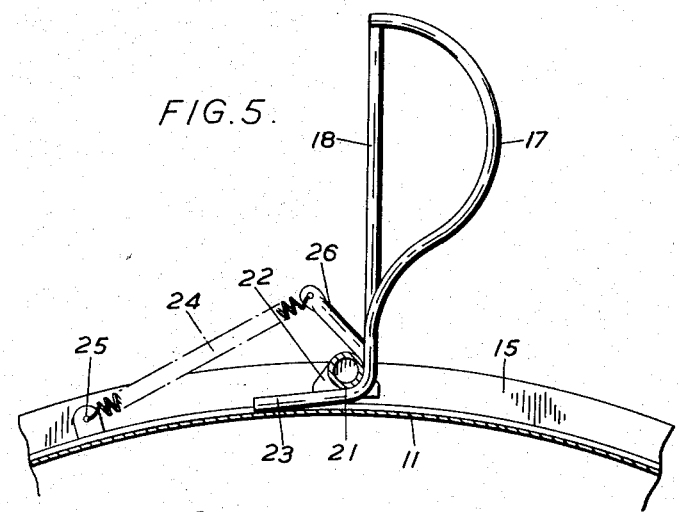
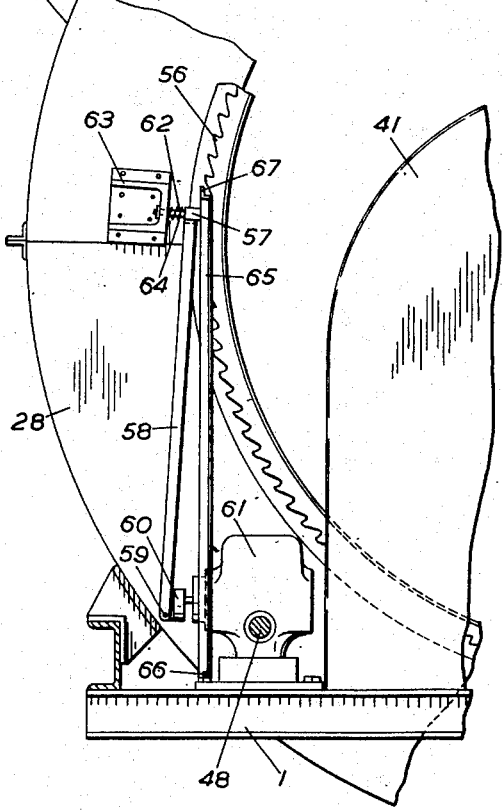
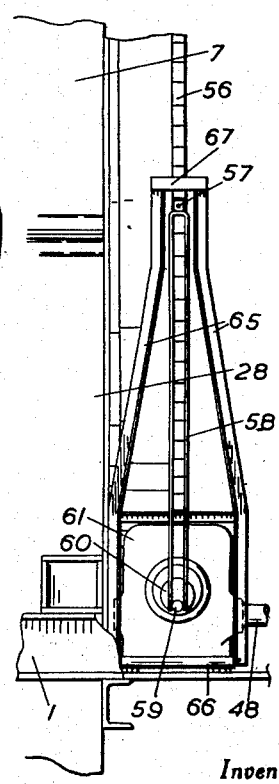
Inventors
MARCUS LANGLEY,
JACOBUS J. GERRITSEN
AND
REGINALD E. FUNNELL
By Emery, Holcombe & Blair
Attorneys

United States Patent Office 2,695,461
Patented Nov. 30, 1954

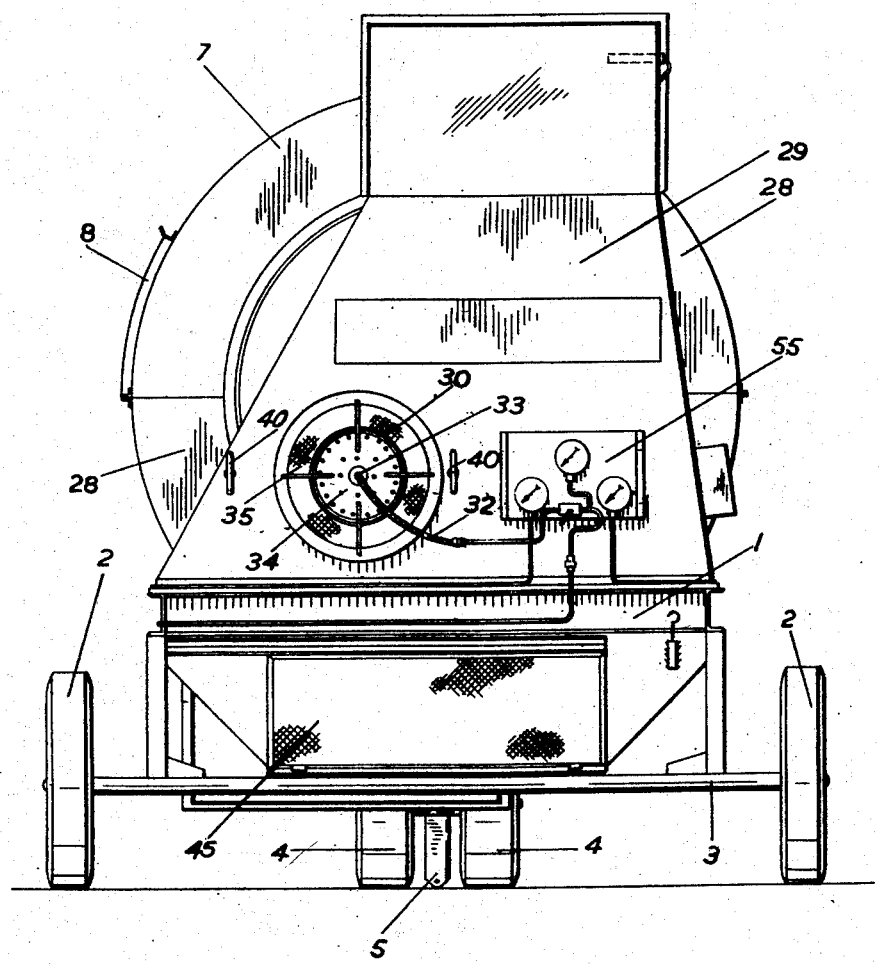

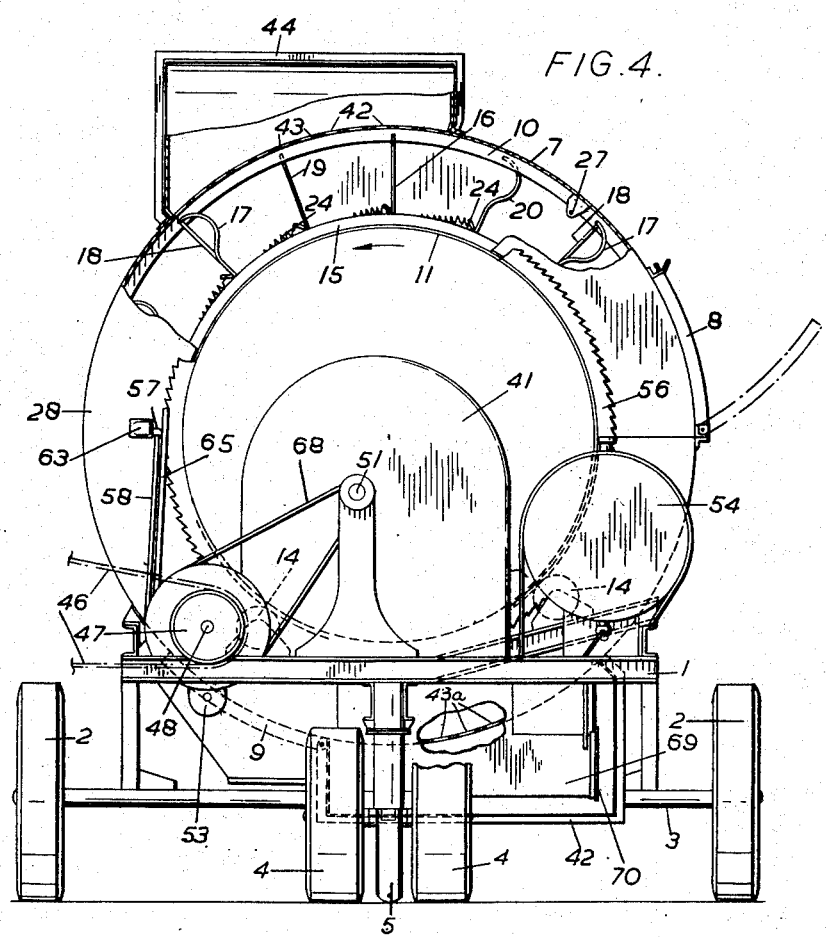

2,695,461

CROP DRYING MACHINE

Marcus Langley, Jacobus Johannes Gerritsen, and Reginald Ernest Funnell, Redhill, England, assignors to Tiltman Langley Laboratories Limited Application March 5, 1951, Serial No. 213,926

Claims priority, application Great Britain March 7, 1950

5 Claims. (Cl. 34—181)

This invention relates to apparatus for drying grass and other long fibrous crops containing moisture, and is particularly concerned with apparatus in which the material to be dried is carried round by a rotary drum while hot gases of combustion are caused to flow through the material to remove the moisture.

It is found that masses of fibrous material such as wet grass when turned over and over in a rotating vessel have a considerable tendency to curl up and, if there is sufficient free space, the result is that the material wraps itself up into individual masses which include cores which are shielded or protected from the drying gases so that only the outer layer of each mass is thoroughly dried and the treated product is not satisfactory.

The present invention is directed to overcoming this advantage by carrying the material round in an annular space which is divided, in effect, into compartments and which is designed to avoid the tendency to form tightly wound masses. Furthermore, the air circulating system is designed to ensure that as much of the available heat as possible is used in drying the material under the best conditions.

According to the invention, therefore, a drum is employed to contain the grass or other fibrous material being dried and has a diameter which is only a fraction of its length; it consists of a fixed outer cylindrical shell or casing and an inner rotary drum having a number of radial tines extending out to the outer shell and arranged in longitudinal rows which serve to divide the annular space between the drums into a number of relatively small sections into which the grass is loaded and in which the grass is carried round. The rows of tines are so close together that the grass has not sufficient space between them in which to curl and wrap itself up and therefore is thoroughly dried in a number of small masses. The burner for supplying the drying gases is placed in a chamber at one end of the drum and the gases from the burner are conducted through the space within the inner drum, thus effecting the first heating of the grass. At the further end, the gases are led radially into a casing which surrounds a part of the outer drum and extends along its length. The wall of the outer drum within this casing is perforated so that the hot gases can enter the outer drum over a part of its periphery by a radial path and then pass around in the annular space between the inner and outer drums in both directions and pass out into a duct at the opposite side of the drum. The duct leads back into the burner chamber carrying the gas containing moisture and a certain amount of fine grass into a collecting chamber. The fine grass is deposited on filter plates and some of the damp moisture bearing gas is allowed to escape, while the remainder is drawn back through the burner and the inner drum for recirculation.

During drying, the grass shrinks considerably so that the annular space between the inner and outer drums is no longer full. As drying continues and the grass is carried around by the inner drum, there may therefore be still some danger of the grass gathering in tight bundles. Moreover, although the grass should not be permitted to gather into bundles and roll round between the inner and outer drum, it has been found that the drying action is improved if the material is tedded, that is to say, turned over upon itself, once per revolution of the inner drum and shaken up, thus breaking up knots and tight bunches of the material. Improved results are therefore obtained by mounting the tines resiliently so as to yield and turn back substantially tangentially to the drum if they encounter a substantial resistance as they revolve. At one point in their revolution, they are tripped or triggered purposely by engaging a member carried by the fixed part of the apparatus so that as they pass this point, each row of tines is turned backwards in turn, permitting the grass between that row of tines and the next to roll over between the inner and outer drum. When they have passed this point, the tines are suddenly released and are pulled into a radial position again by springs. This sudden release frees the grass in the annular space and breaks up any knots.

In this crop drying apparatus, it is also desirable to be able to regulate the temperature of the gases circulating through the material. In apparatus in which the gases consist of air and the hot products of combustion of a light sheet metal oil burner comprises concentric cylinders through which primary and secondary air pass and over which tertiary air is drawn, this regulation can be achieved in at least two ways. The oil supply to the burner may be regulated and this is preferably under the control of a thermostatic valve controlled by the gas temperature at some point in the circulatory cycle. The temperature may also be controlled by varying the quantity of tertiary air entering the system. This air is drawn into the system through a conical passage between the end of the burner and the main gas ducting, which is flared outwards to fit over the burner snout. By moving the conical end of the ducting axially so that it fits over the snout of the burner to a greater or lesser extent, the quantity of tertiary air drawn in through this passage may be varied. A single suction fan may be employed for circulating the main volume of drying gases and also for supplying the air to the burner when necessary.

In drums in which fixed tines are used, as well as tines carried by the rotary drum, to produce a combing action, the resilient mounting of the rotary tines safeguards against the locking of the machine due to grass jamming between the two sets of tines.

An example of an apparatus according to the invention mounted on a wheeled chassis for transport from site to site is illustrated in the accompanying drawings, in which:

Figure 3 is an end view of the apparatus as seen from the direction III in Figure 1;

Figure 4 is an end view of the apparatus in part section as seen from the direction IV in Figure 1;

Figure 5 is a detailed view showing the mounting of the tines;

Figure 6 is an enlarged view of part of Figure 4 showing the mechanism for rotating the inner drum;

Figure 7 is a side view of the mechanism for rotating the inner drum as seen from the left in Figure 6.

Figure 1:
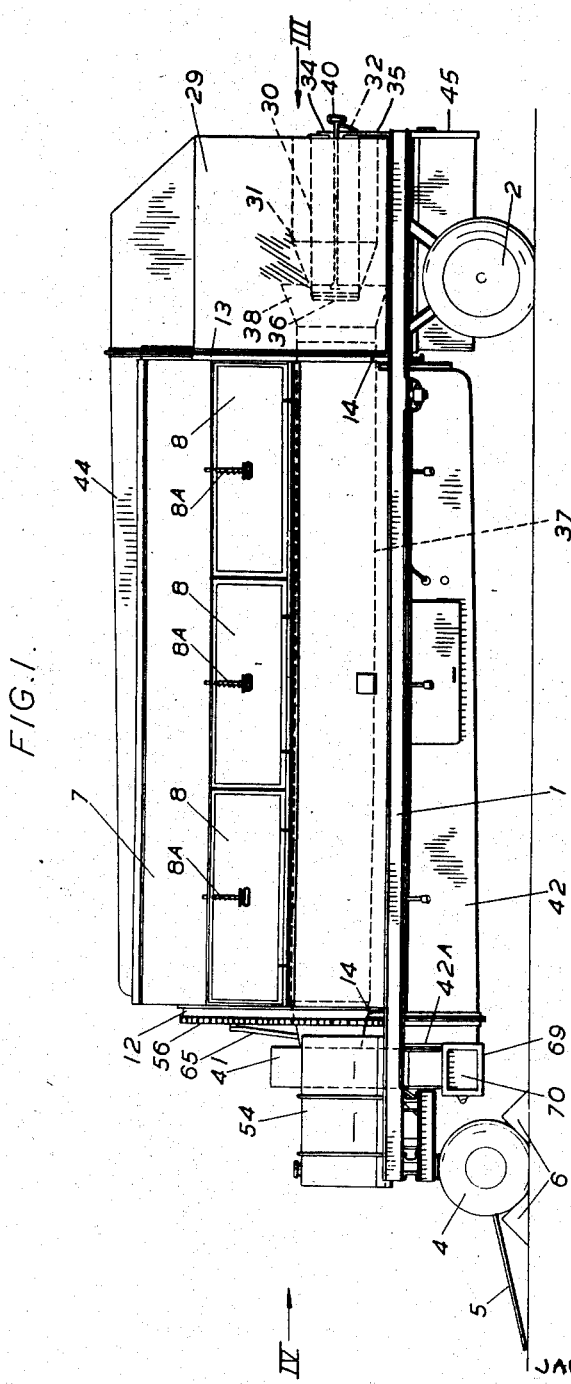
Figure 1 is a side elevation of the apparatus.

Referring to Figures 1, 3 and 4, the apparatus is carried on a chassis 1 made up of channel sections and mounted on wheels 2 carried by a rear axle 3, and having a pair of articulated steering wheels 4 to which a draw-bar 5 is attached at the front end of the chassis 1. Chocks 6 (Figure 1) are provided to hold the apparatus stationary when it is in use.

A stationary outer drum 7 is mounted on the chassis 1 and is provided with hinged doors 8 in the upper half of one side of the drum, and with a further set of similar doors 9 (Figure 4) at the opposite side of the lower half of the drum. Damp material to be dried is loaded through the doors 8 and drops out of the doors 9 when the latter are opened. Hand operated spring latches 8A normally retain these doors in closed position. The drum 7 is stiffened internally by ribs 10 (Figure 4).

The inner drum 11 projects at either end beyond the ends of the stationary drum 7 and is provided with stiffening rings 12, 13 at each end which are of channel section and serve as tracks which run on rollers 14 rotatably mounted on the chassis at either end of the drum 7. The inner drum 11 is thus free to rotate about the axis of the outer drum 7. The inner drum is also stiffened by three ribs 15 equally spaced along its length so that it is divided lengthwise into four sections. Each of these sections carries eight rows of tines (Figure 4) which are alternately straight tines 16 and curved tines 17. The end tines of each of the sets of curved tines 17 are also straight tines 18. The sets of tines on neighbouring sections of the drum are staggered, as shown at 19, 20 which are tines of the second section of the drum. Each set of tines consists of six tines in each row. The tines of each set are welded to a tube 21 (Figure 5) which is pivoted at each end in lugs 22 carried by the ribs 15 and stiffening rings 12, 13. The inner ends 23 of the tines are bent round at right angles in the direction of rotation of the drum 11 and the sets of tines are pulled upright, that is to say perpendicular to the surface of the drum, by springs 24 anchored at one end 25 to the ribs 15 and at the other end to arms 26 secured to the tube 21. Thus if the tines encounter undue resistance as the drum 11 rotates, they can yield and turn backwards stretching the springs 24 until they have passed the resistance. To allow the material to be dried to be turned over once per revolution, the tines are purposely turned back in this way at one point by the engagement of pegs 27 (Figure 4) carried by the ribs 10 of the outer drum 7, and which engage the end tines of each set of tines thus turning the whole set backwards and suddenly releasing them. The material is thus allowed to turn over and any tight masses are broken up by the tines when they are suddenly restored to their normal position by springs 24.

The annular space between the outer drum 7 and the inner drum 11 is closed at each end by end rings 28 secured to the outer drum 7.

At the rear end of the drums a burner chamber 29 is mounted on the chassis 1. This chamber contains an oil fuel burner which comprises an inner cylinder 30 (Figure 1) and an outer cylinder 31. Fuel oil is supplied by a pipe 32 (Figure 3) to a jet 33, and primary air is drawn in to the cylinder 30 through the perforated plate 34 at its rear end. Secondary air is drawn in to the annular space between the cylinders 30 and 31 through the mesh screen 35 and it mixes with the primary air and products of combustion by passing through the perforations in the cylinder 30. The products of combustion and the mixed primary and secondary air emerge from the snout 36 of the burner and pass into a duct 37 which runs the length of the inner drum 11. The mouth of this duct is not connected directly to the snout of the burner 36 but is flared as at 38 so that tertiary air can be drawn into the duct from the burner chamber 29. The end conical flared section 38 of the duct 37 may be slid in and out of the remainder of the duct 37 so that the annular space between the flared end 38 and the snout 36 of the burner can be altered in size, thus varying the amount of tertiary air drawn in. The position of the flared end 38 is adjusted by rods 39 attached to it and passing through the rear wall of the burner chamber 29 where they are bent into suitable handles 40.

Figure 2:
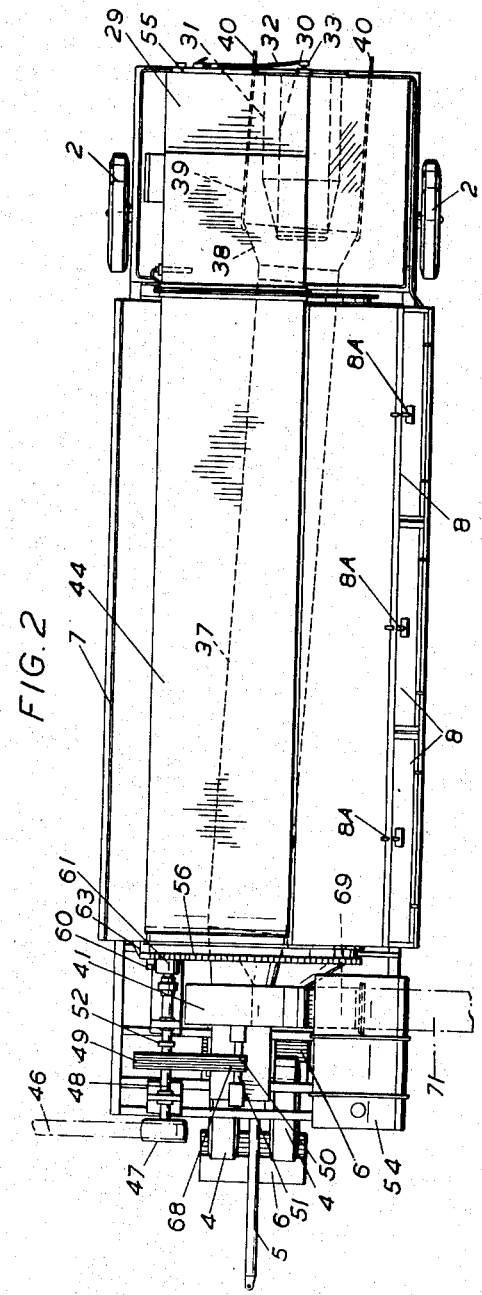
Figure 2 is a plan view of the apparatus.

The duct 37 leads to the intake of an air circulating fan 41 mounted on the chassis at the front end of the drums 7 and 11. As the axis of this fan is off-set slightly on one side of the centre line of the chassis and the axis of the burner is off-set to the other side, the duct 37 is skewed in relation to the centre line of the chassis 1, as seen in Figure 2. The hot gases in passing down the duct 37 serve to heat the interior of the rotary drum 11 and thus preheat the material being dried.

The fan 41 delivers air to a chamber 42 (Figure 1), which extends beneath the drum 7 for the whole length of that drum. The hot gases pass from the chamber 42 through perforations 43a (Figure 4) in the wall of the drum 7 into the interior of the drum, and are thus distributed evenly along the entire length of the annular space between the outer drum 7 and the inner drum 11. The hot gases divide and pass in either direction around the annular space between the two drums and escape at a point diametrically opposite to the point of entry through similar perforations 43 in the wall of the outer drum 7 into a collecting chamber 44 mounted on the top of the stationary drum 7. This collecting chamber leads to the top of the burner chamber 29, so that the circulation of the gas is complete. The gas escaping from the drying space may carry with it finely powdered grass and other material, and this is deposited on filter screens (not shown) in the bottom of the burner chamber 29, from which a certain amount of the moisture laden air escapes through the opening 45 at the bottom of the rear wall.

The machine is designed to be driven by a belt 46 from an agricultural tractor. This belt drives a pulley 47 on a shaft 48 which also carries a multiple V-belt pulley 49 from which a smaller pulley 50 on the shaft 51 of the fan 41 is driven through belts 68. The shaft 48 also carries a pulley 52 from which the drive is taken to an oil pump 53, which draws oil from the storage tank 54 and pumps it to the control panel 55 (Figure 3) from which it reaches the burner through the pipe 32.

The inner drum 11 has attached to its front end a ring of ratchet teeth 56 which can be engaged by a pawl 57 on the end of an arm 58 pivoted at 59 to a crank 60 which is driven through reduction gearing 61 from the shaft 48. The pawl 57 is guided by a pin 62 which slides in a slot in a bracket 63, not shown in Figure 7, secured to the outer drum 7, and is urged into engagement with the teeth 56 by a spring 64. Thus, a vertical reciprocating movement is imparted to the pawl 57 so that at each downward stroke it turns the drum 11 by an amount equivalent to 1 tooth 56, but the pawl 57 and the teeth 56 are so shaped that on the upward stroke the pawl 57 rides freely over the next tooth ready to engage it on the next downward stroke. The drum 11 is prevented from moving backwards during the upward movement of the pawl 57 by a detent member 65 pivoted to the chassis at 66, and having a cross-piece 67 which engages the radial faces of the teeth 56.

Figure 8:
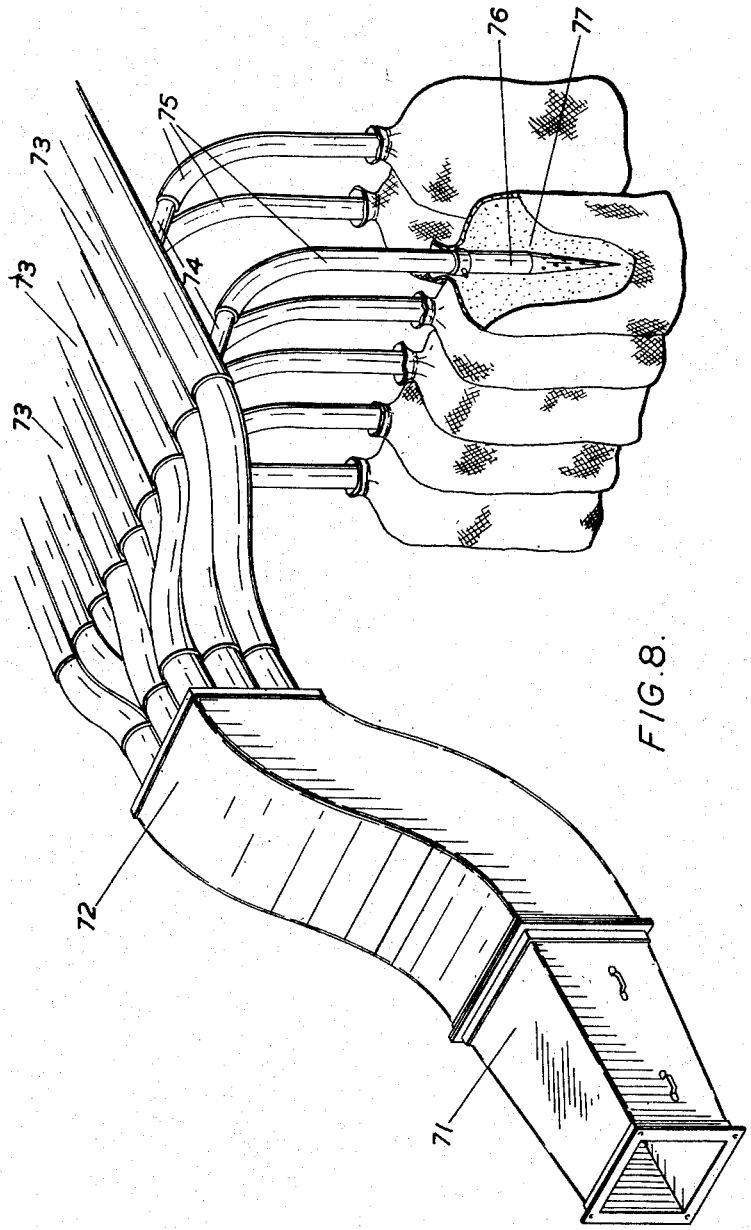
Figure 8 shows an arrangement of ducting and pipes for attachment to the apparatus shown in the preceding figures for drying grain in sacks or bins.

At the point where the casing of the fan 41 leads into the chamber 42 beneath the drum 7, a shutter 42a is provided, to close the entry of the chamber 42. An alternative outlet 69 is provided which is normally closed by a plate 70, but when it is desired to dry granular material in storage bins, sacks, or other containers, this plate may be removed and the hot air distribution system illustrated in Figure 8 is attached. The ducting 71 is attached to the outlet 69 and leads to a manifold 72 from which, in this case, nine distribution pipes 73 lead. Each of these pipes has up to seven branches 74 to which rubber tubes 75 may be attached which lead to perforated conical nozzles 76 which are pushed into the granular material 77 to be dried.

We claim:

1. An apparatus for drying grass and other long fibrous crops, comprising a stationary outer drum, an inner rotary drum co-axial with said outer drum, the difference in diameter of the two drums being small compared with the diameter of the inner drum, means to rotate said inner drum, tines carried by said inner drum and extending outwards from said inner drum to approach closely said outer drum, means for admitting material to be dried into the annular space between said drums and for enabling said material to be removed after drying, means to generate hot drying gases and convey them to and from said annular space including a fan arranged to draw the hot gases through the said inner drum, a chamber extending the length of said outer drum arranged to receive the gases from the fan and surrounding less than half of the circumference of the said outer drum, the part of the wall of said outer drum between said chamber and said annular space being perforated to admit said gas to said annular space, a second chamber diametrically opposite said first chamber extending the length of said outer drum and surrounding less than half of its circumference, the part of said wall of said outer drum separating said second chamber from said annular space also being perforated to permit said gases to escape into said second chamber, a duct connecting said second chamber to said means to generate said hot gases, and means to permit part of said gases from said second chamber to escape.

2. An apparatus according to claim 1, in which a duct is provided within said inner drum to convey said hot gases through said inner drum.

3. An apparatus for drying grass and other long fibrous crops, comprising a stationary outer drum, an inner rotary drum co-axial with said outer drum, the difference in diameter of the two drums being small compared with the diameter of the inner drum, means to rotate said inner drum including a plurality of projections on a circular member secured to one end of said drum, a reciprocating member adapted to engage one of said projections during movement of the reciprocating member in one direction, and means to enable said reciprocating member to ride freely over this projection during movement in the opposite direction, tines carried by said inner drum and extending outwards from said inner drum to approach closely said outer drum, said outer drum having removable parts for periodically admitting material to be dried into the annular space between said drums and for removing said material after drying, means to generate hot drying gas and ducts to convey such drying gas to and from diametrically opposite regions of said annular space and distribute said gas evenly along said space, and means to permit part of said gas to escape after leaving said annular space, together with means for recirculating the remainder of said gas to said hot gas generating means.

4. An apparatus according to claim 3, further comprising a resilient connection in said reciprocating member, enabling it to yield if the resistance to turning the drum becomes excessive.

5. An apparatus for drying grass and other long fibrous crops, comprising a stationary outer drum, an inner rotary drum coaxial with said outer drum, the difference in diameter between the two drums being small compared with the diameter of the inner drum, means to rotate said inner drum, tines carried by said inner drum and extending outwards from said inner drum to approach closely said outer drum, said tines being resiliently mounted to enable them to yield if undue resistance is encountered during rotation, means to turn said tines backwards and suddenly release them once during each revolution of the inner drum, said outer drum having removable parts for periodically admitting material to be dried into the annular space between said drums and for removing said material after drying, means to generate hot drying gas and ducts to convey the same to and from diametrically opposite regions of said annular space and distribute it evenly along said space, and means to permit part of said gas to escape after leaving said annular space and to recirculate the remainder of said gas to said hot gas generating means.

References Cited in the file of this patent

UNITED STATES PATENTS

| Number | Name | Date |
|---|---|---|
| 1,534,180 | Komarek | Apr. 21, 1925 |
| 1,555,374 | Johnston | Sept. 29, 1925 |
| 1,642,469 | Tucker et al. | Sept. 13, 1927 |
| 1,735,397 | Hiller | Nov. 12, 1929 |
| 1,791,561 | Heyn et al. | Feb. 10, 1931 |
| 2,026,922 | Vincent | Jan. 7, 1936 |
| 2,143,505 | Arnold | Jan. 10, 1939 |
| 2,319,674 | French et al. | May 18, 1943 |
| 2,518,364 | Owen | Aug. 8, 1950 |
| 2,537,186 | Everett | Jan. 9, 1951 |

FOREIGN PATENTS

| Number | Country | Date |
|---|---|---|
| 14,637 | Great Britain | 1912 |